(12) United States Patent
Oguro

(10) Patent No.: US 12,291,108 B2
(45) Date of Patent: May 6, 2025

(54) VEHICLE CONTROL APPARATUS

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 269 days.

(21) Appl. No.: 17/871,228

(22) Filed: Jul. 22, 2022

(65) Prior Publication Data

US 2023/0029521 A1 Feb. 2, 2023

(30) Foreign Application Priority Data

Aug. 2, 2021 (JP) ................. 2021-126451

(51) Int. Cl.
*B60L 15/36* (2006.01)
*B60L 7/18* (2006.01)

(52) U.S. Cl.
CPC ............. *B60L 15/36* (2013.01); *B60L 7/18* (2013.01); *B60L 2240/14* (2013.01); *B60L 2240/423* (2013.01)

(58) Field of Classification Search
CPC ........ B60L 15/36; B60L 7/18; B60L 2240/14; B60L 2240/423
See application file for complete search history.

(56) References Cited

U.S. PATENT DOCUMENTS

2016/0264111 A1* 9/2016 Doi .................... B60T 8/267
2020/0148223 A1 5/2020 Fukatani et al.

FOREIGN PATENT DOCUMENTS

| JP | 2005-210798 A | | 8/2005 |
|---|---|---|---|
| JP | 2020-077266 A | | 5/2020 |
| JP | 2020089044 A | * | 6/2020 |

* cited by examiner

*Primary Examiner* — David P. Merlino
*Assistant Examiner* — Shivam Sharma
(74) *Attorney, Agent, or Firm* — Rimon P.C.

(57) ABSTRACT

A vehicle control apparatus includes a first traveling motor, a second traveling motor, and a control system. The first traveling motor is coupled to a first wheel of a vehicle. The second traveling motor is coupled to a second wheel of the vehicle. The control system is configured to decrease a power running torque of the first traveling motor and increase a power running torque of the second traveling motor in a case where a first distance from the vehicle to a contact predicted spot or a contact object is less than a first threshold during traveling of the vehicle, and increase a regenerative torque of the first traveling motor and increase a regenerative torque of the second traveling motor in a case where a second distance from the vehicle to the contact object is less than a second threshold that is less than the first threshold during the traveling.

2 Claims, 10 Drawing Sheets

VEHICLE CONTROL APPARATUS

CROSS-REFERENCE TO RELATED APPLICATIONS

The present application claims priority from Japanese Patent Application No. 2021-126451 filed on Aug. 2, 2021, the entire contents of which are hereby incorporated by reference.

BACKGROUND

The technology relates to a vehicle control apparatus to be applied to a vehicle. A vehicle such as an electric vehicle is provided with a traveling motor coupled to wheels. For example, reference is made to Japanese Unexamined Patent Application Publication (JP-A) Nos. 2020-89044 and 2005-210798. JP-A No. 2020-77266 discloses a vehicle, such as an electric vehicle, that automatically activates brakes on the basis of a collision prediction.

SUMMARY

An aspect of the technology provides a vehicle control apparatus to be applied to a vehicle. The vehicle control apparatus includes a first traveling motor, a second traveling motor, and a control system. The first traveling motor is coupled to a first wheel positioned at a front part of the vehicle in a traveling direction of the vehicle. The second traveling motor is coupled to a second wheel positioned at a rear part of the vehicle in the traveling direction. The control system includes a processor and a memory that are coupled to each other to allow for a communication between the processor and the memory, and configured to control each of the first traveling motor and the second traveling motor. The control system is configured to decrease a power running torque of the first traveling motor and increase a power running torque of the second traveling motor in a case where a first distance from the vehicle to a contact predicted spot or a contact object is less than a first threshold during traveling of the vehicle, and is configured to increase a regenerative torque of the first traveling motor and increase a regenerative torque of the second traveling motor in a case where a second distance from the vehicle to the contact object is less than a second threshold that is less than the first threshold during the traveling of the vehicle.

An aspect of the technology provides a vehicle control apparatus to be applied to a vehicle. The vehicle control apparatus includes a first traveling motor, a second traveling motor, and circuitry. The first traveling motor is coupled to a first wheel positioned at a front part of the vehicle in a traveling direction of the vehicle. The second traveling motor is coupled to a second wheel positioned at a rear part of the vehicle in the traveling direction. The circuitry is configured to: decrease a power running torque of the first traveling motor and increase a power running torque of the second traveling motor in a case where a first distance from the vehicle to a contact predicted spot or a contact object is less than a first threshold during traveling of the vehicle; and increase a regenerative torque of the first traveling motor and increase a regenerative torque of the second traveling motor in a case where a second distance from the vehicle to the contact object is less than a second threshold that is less than the first threshold during the traveling of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
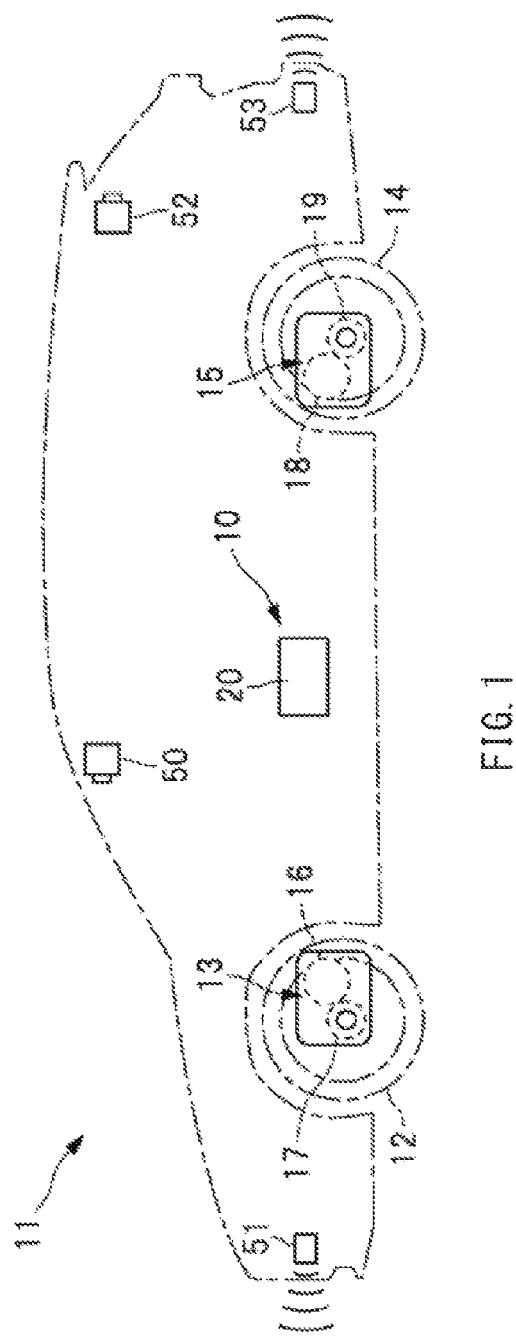
FIG. 1 is a diagram illustrating an example of a configuration of a vehicle provided with a vehicle control apparatus according to one example embodiment of the technology.

A vehicle such as an electric vehicle often controls a state of a traveling motor from a power running state to a regeneration state upon activating an automatic brake. Controlling the state of the traveling motor from the power running state to the regeneration state, however, can generate a shock upon switching a direction of generation of a motor torque. Accordingly, it is desirable that the motor torque be changed moderately. On the other hand, the moderate change in the motor torque can constitute a factor of delaying a rise of a regenerative torque. Further, the delay in the rise of the regenerative torque of the traveling motor can constitute a factor of decreasing a braking performance of the automatic brake. Accordingly, it is desirable that the regenerative torque of the traveling motor be raised quickly.

It is desirable to provide a vehicle control apparatus that makes it possible to quickly raise a regenerative torque of a traveling motor.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant descrip-

Configuration of Vehicle

FIG. 1 is a diagram illustrating an example of a configuration of a vehicle 11 provided with a vehicle control apparatus 10 according to an example embodiment of the technology. Referring to FIG. 1, the vehicle 11 may include a front drive unit 13 that drives front wheels 12, and a rear drive unit 15 that drives rear wheels 14. The front drive unit 13 may include a front motor 16 and a front differential 17. The rear drive unit 15 may include a rear motor 18 and a rear differential 19. With this configuration, the front wheels 12 may be coupled to the front motor 16 and the rear wheels 14 may be coupled to the rear motor 18. In one embodiment, the front wheels 12 may serve as a "first wheel". In one embodiment, the rear wheels 14 may serve as a "second wheel". In one embodiment, the front motor 16 may serve as a "first traveling motor". In one embodiment, the rear motor 18 may serve as a "second traveling motor".

Figure 2:
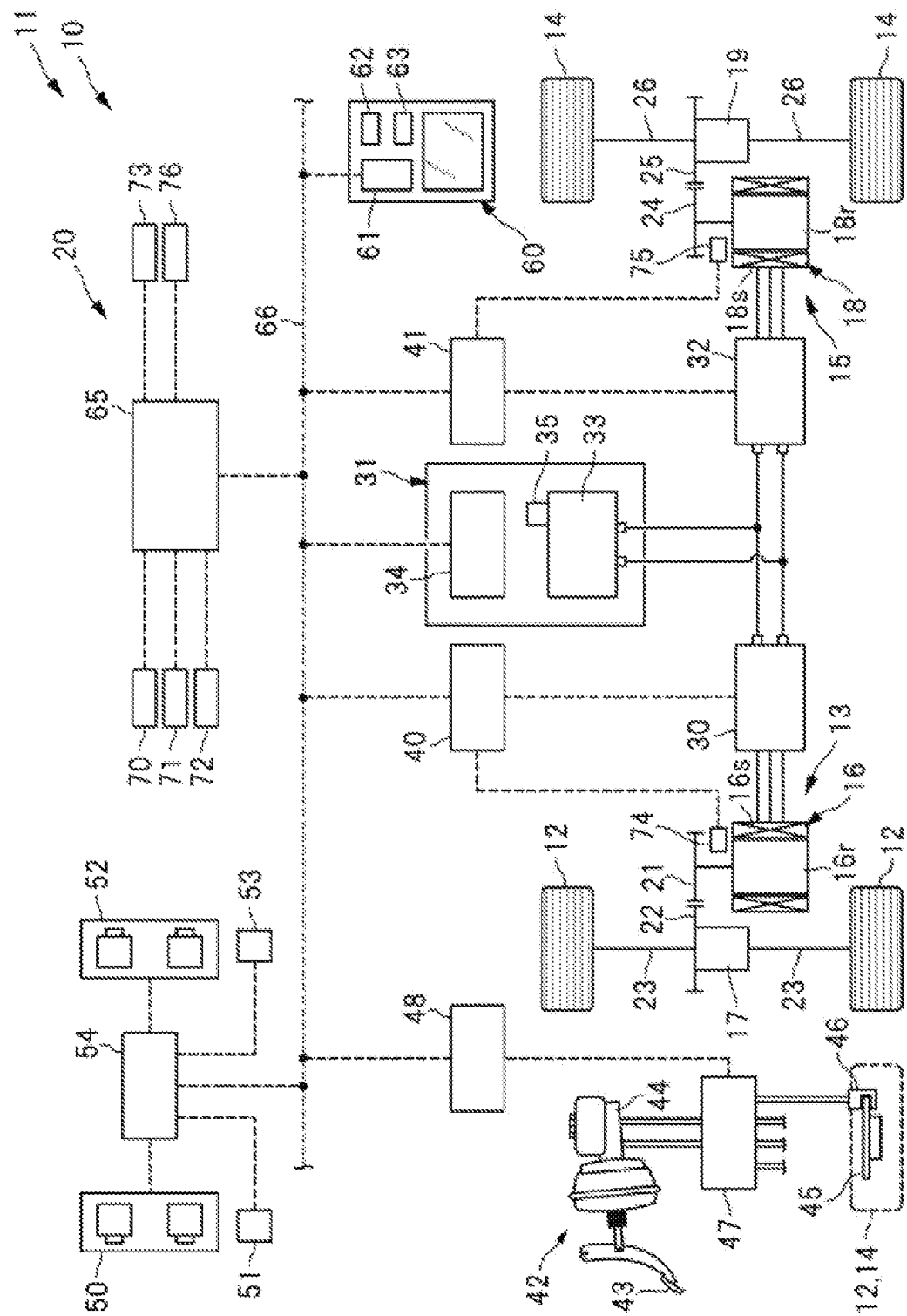
FIG. 2 is a diagram illustrating an example of a front drive unit, a rear drive unit, and a control system.

FIG. 2 is a diagram illustrating an example of the front drive unit 13, the rear drive unit 15, and the control system 20. Referring to FIG. 2, the front drive unit 13 may include the front motor 16 and the front differential 17. The front motor 16 may have a rotor 16r coupled to a drive gear 21. The drive gear 21 may be in mesh with a driven gear 22 fixed to the front differential 17. An axle 23 extending from the front differential 17 may be coupled to the front wheels 12. Similarly, the rear drive unit 15 may include the rear motor 18 and the rear differential 19. The rear motor 18 may have a rotor 18r coupled to a drive gear 24. The drive gear 24 may be in mesh with a driven gear 25 fixed to the rear differential 19. An axle 26 extending from the rear differential 19 may be coupled to the rear wheels 14.

The front motor 16 may have a stator 16s coupled to an inverter 30. The inverter 30 may be coupled to a battery pack 31. Similarly, the rear motor 18 may have a stator 18s coupled to an inverter 32. The inverter 32 may be coupled to the battery pack 31. The battery pack 31 may include a battery module 33 having a plurality of battery cells, and a battery control unit 34 that monitors charging and discharging of the battery module 33. The battery pack 31 may also include a battery sensor 35 that detects factors including, for example, a charging/discharging current and a terminal voltage. The battery control unit 34 may calculate a state of charge (SOC) of the battery module 33 on the basis of the factors including, for example, the charging/discharging current and the terminal voltage detected by the battery sensor 35.

The inverter 30 of the front motor 16 may be coupled to a front motor control unit 40. The front motor control unit 40 may control the inverter 30 that includes, for example, a plurality of switching devices to control an electric conduction state of the stator 16s and thereby to control a motor torque, i.e., a power running torque or a regenerative torque, of the front motor 16. Upon controlling the front motor 16 to be in a power running state, electric power may be supplied from the battery module 33 to the stator 16s via the inverter 30. Upon controlling the front motor 16 to be in a regeneration state, i.e., an electric power generating state, electric power may be supplied from the stator 16s to the battery module 33 via the inverter 30.

Similarly, the inverter 32 of the rear motor 18 may be coupled to a rear motor control unit 41. The rear motor control unit 41 may control the inverter 32 that includes, for example, a plurality of switching devices to control an electric conduction state of the stator 18s and thereby to control a motor torque, i.e., a power running torque or a regenerative torque, of the rear motor 18. Upon controlling the rear motor 18 to be in a power running state, electric power may be supplied from the battery module 33 to the stator 18s via the inverter 32. Upon controlling the rear motor 18 to be in a regeneration state, i.e., an electric power generating state, electric power may be supplied from the stator 18s to the battery module 33 via the inverter 32.

The vehicle 11 may include a brake device 42 that puts a brake on the front wheels 12 and the rear wheels 14. The brake device 42 may include a master cylinder 44 that outputs a brake fluid pressure in conjunction with a brake pedal 43, and calipers 46 that put a brake on disc rotors 45 of the respective front wheels 12 and rear wheels 14. Between the master cylinder 44 and the calipers 46 is a brake actuator 47 that controls the brake fluid pressure to be supplied to each of the calipers 46. The brake actuator 47 may have unillustrated devices including, for example, an electric pump, an accumulator, and an electromagnetic valve. The brake actuator 47 may be coupled to a brake control unit 48 that controls the brake actuator 47.

The vehicle 11 may include a front camera 50 that captures an image of an environment at the front of the vehicle 11, and a front radar 51 that detects a distance from the vehicle 11 to an obstacle positioned at the front of the vehicle 11. The vehicle 11 may also include a rear camera 52 that captures an image of an environment at the rear of the vehicle 11, and a rear radar 53 that detects a distance from the vehicle 11 to an obstacle positioned at the rear of the vehicle 11. The front camera 50, the rear camera 52, the front radar 51, and the rear radar 53 may be coupled to a driving assist control unit 54 that executes an automatic brake control. The driving assist control unit 54 may determine a possibility of a collision of the vehicle 11 traveling forward with a collision object such as another vehicle, on the basis of factors including, for example, image data obtained from the front camera 50 and distance data obtained from the front radar 51. Similarly, the driving assist control unit 54 may determine a possibility of a collision of the vehicle 11 traveling backward with a collision object such as another vehicle, on the basis of factors including, for example, image data obtained from the rear camera 52 and distance data obtained from the rear radar 53. The driving assist control unit 54 may execute the automatic brake control in a case where the driving assist control unit 54 determines that there is the possibility of the collision of the vehicle 11, and may thereby activate the brake device 42 via the brake control unit 48 and cause the front motor 16 and the rear motor 18 to be in the regeneration state via the front motor control unit 40 and the rear motor control unit 41. Thus, upon the automatic brake control, the front wheels 12 and the rear wheels 14 may be braked on the basis of braking force of the brake device 42, and may also be braked on the basis of the regenerative torque of the front motor 16 and the rear motor 18.

The vehicle 11 may include a navigation system 60 that performs a navigation of a route to the destination. The navigation system 60 may include a navigation control unit 61 that performs the route navigation or the like, a memory 62 that holds map data, and a communication unit 63 that receives map update data or the like from, for example, an external server. The memory 62 of the navigation system 60 may hold, as one of pieces of data configuring the map data, data on a collision predicted spot such as an intersection at which an accident tends to occur more easily, i.e., data on the collision predicted spot at which a possibility of the execution of the automatic brake control is high. It should be noted that the illustrated example embodiment may use the fixed navigation system 60 mounted on the vehicle 11, although it is not limited thereto. In some embodiments, the navigation system 60 may be a mobile information terminal such as a smartphone.

Control System

The vehicle control apparatus 10 has a control system 20 that controls units including, for example, the front drive unit 13 and the rear drive unit 15 and has a plurality of electronic control units. The control system 20 may have the electronic control units including the battery control unit 34, the front motor control unit 40, the rear motor control unit 41, the brake control unit 48, the driving assist control unit 54, and the navigation control unit 61 described above. The control system 20 may have the electronic control units including a vehicle control unit 65 that outputs a control signal to each of the battery control unit 34, the front motor control unit 40, the rear motor control unit 41, the brake control unit 48, the driving assist control unit 54, and the navigation control unit 61. The battery control unit 34, the front motor control unit 40, the rear motor control unit 41, the brake control unit 48, the driving assist control unit 54, the navigation control unit 61, and the vehicle control unit 65 may be so coupled to each other as to allow for a mutual communication via an in-vehicle network such as CAN (Controller Area Network) or LIN (Local Interconnect Network). The vehicle control unit 65 may set operation targets of respective devices including, for example, the front motor 16 and the rear motor 18, on the basis of input data obtained from various control units including the battery control unit 34, the front motor control unit 40, the rear motor control unit 41, the brake control unit 48, the driving assist control unit 54, and the navigation control unit 61 and various sensors to be described later. The vehicle control unit 65 may generate the control signals that are based on the operation targets of the respective devices including, for example, the front motor 16 and the rear motor 18, and output the control signals to the respective various control units including the battery control unit 34, the front motor control unit 40, the rear motor control unit 41, the brake control unit 48, the driving assist control unit 54, and the navigation control unit 61.

The vehicle control unit 65 may be coupled to the sensors including an accelerator sensor 70 that detects an amount of operation of an accelerator pedal (hereinafter referred to as an "accelerator position"), and a brake sensor 71 that detects an amount of operation of the brake pedal 43. The vehicle control unit 65 may also be coupled to the sensors including a vehicle speed sensor 72 that detects a vehicle speed as a traveling speed of the vehicle 11, and a GPS (Global Positioning System) sensor 73 that receives signals from GPS satellites and detects a traveling position of the vehicle 11. The front motor control unit 40 may be coupled to a sensor such as a motor rotation sensor 74, such as a resolver, that detects a rotation speed of the front motor 16. The rear motor control unit 41 may be coupled to a sensor such as a motor rotation sensor 75, such as a resolver, that detects a rotation speed of the rear motor 18. The vehicle control unit 65 may be coupled to a start switch 76 that is to be operated by a driver of the vehicle 11 upon starting up the control system 20.

Figure 3:
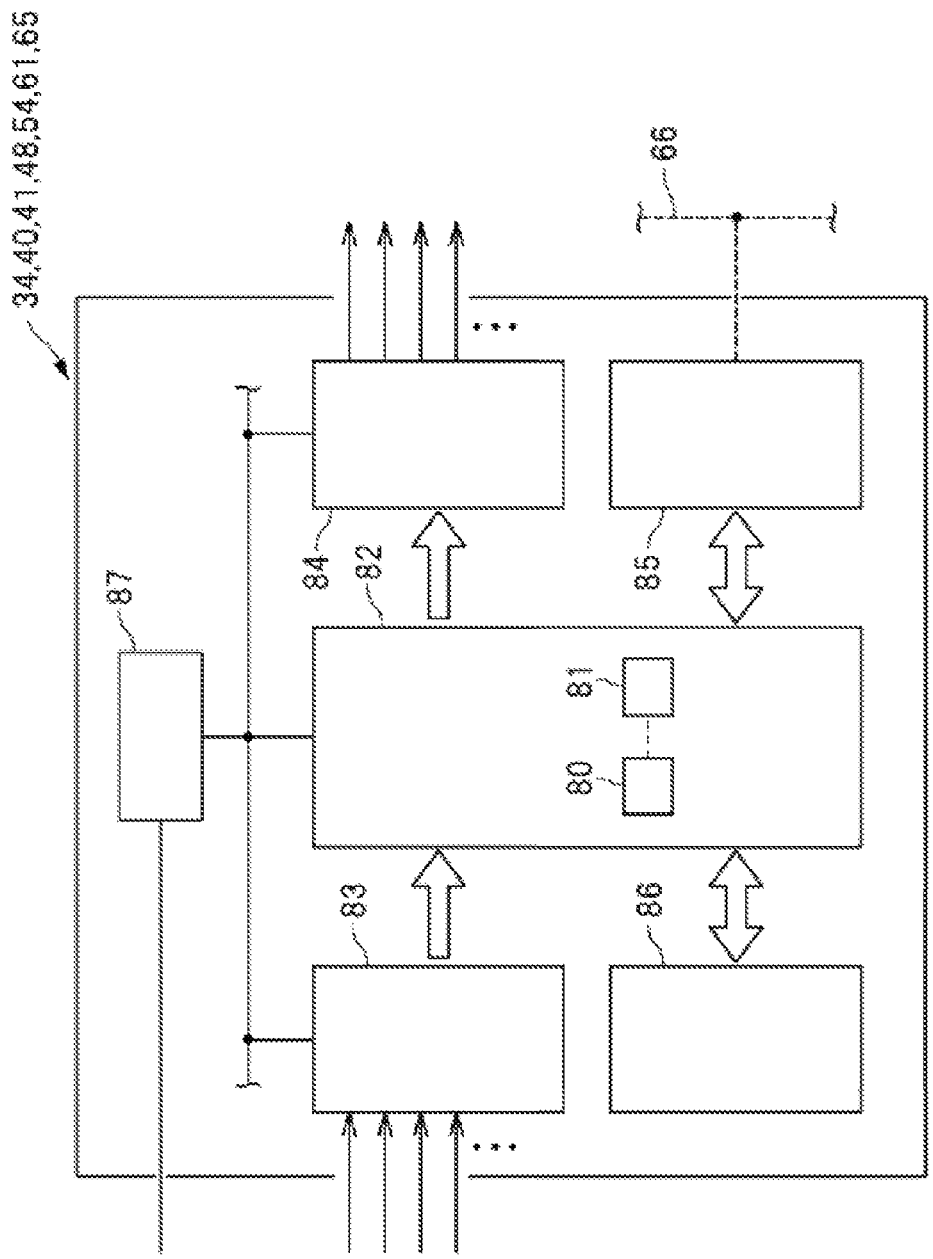
FIG. 3 is a diagram schematically illustrating a basic configuration of each control unit.

FIG. 3 is a diagram schematically illustrating a basic configuration of each of the battery control unit 34, the front motor control unit 40, the rear motor control unit 41, the brake control unit 48, the driving assist control unit 54, the navigation control unit 61, and the vehicle control unit 65. Referring to FIG. 3, the battery control unit 34, the front motor control unit 40, the rear motor control unit 41, the brake control unit 48, the driving assist control unit 54, the navigation control unit 61, and the vehicle control unit 65 each may be or may have a microprocessor 82 that has devices including, for example, a processor 80 and a memory 81. The memory 81 may hold a predetermined program. The processor 80 may execute a command set of the program. The processor 80 and the memory 81 are so coupled to each other as to allow for a communication between the processor 80 and the memory 81. FIG. 3 illustrates an example in which the microprocessor 82 includes one processor 80 and one memory 81, although a configuration of the microprocessor 82 is not limited thereto. In some embodiments, the microprocessor 82 may include a plurality of processors 80. In some embodiments, the microprocessor 82 may include a plurality of memories 81.

The battery control unit 34, the front motor control unit 40, the rear motor control unit 41, the brake control unit 48, the driving assist control unit 54, the navigation control unit 61, and the vehicle control unit 65 each may have devices including, for example, an input conversion circuit 83, a drive circuit 84, a communication circuit 85, an external memory 86, and a power supply circuit 87. The input conversion circuit 83 may convert a signal received from various sensors into a signal receivable by the microprocessor 82. The drive circuit 84 may generate a drive signal to be supplied to actuators including, for example, the front motor 16 and the rear motor 18 described above, on the basis of a signal outputted from the microprocessor 82. The communication circuit 85 may convert a signal outputted from the microprocessor 82 into a communication signal directed to another control unit. The communication circuit 85 may also convert a communication signal received from another control unit into a signal receivable by the microprocessor 82. The power supply circuit 87 may supply a stable power supply voltage to each of devices including, for example, the microprocessor 82, the input conversion circuit 83, the drive circuit 84, the communication circuit 85, and the external memory 86. The external memory 86 may be, for example, a nonvolatile memory, and hold data or the like to be retained even upon no electric power conduction.

Requested Drive Force

Figure 4:
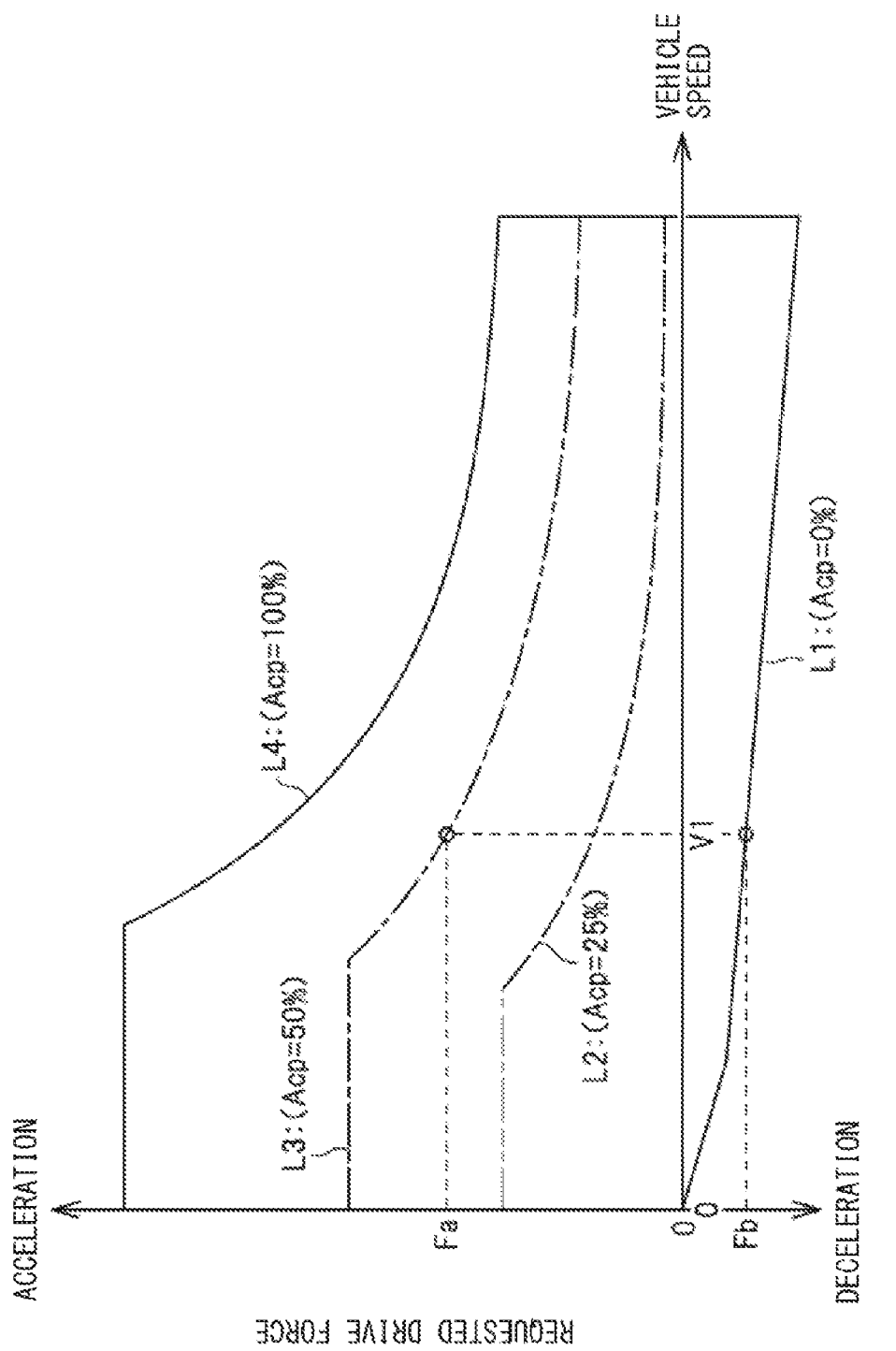
FIG. 4 is a diagram illustrating an example of a drive force map that illustrates a requested drive force.

FIG. 4 is a diagram illustrating an example of a drive force map that illustrates a requested drive force. Referring to FIG. 4, characteristic lines L1 to L4 each indicating the requested drive force for the corresponding accelerator position Acp may be set for the drive force map. For example, the vehicle control unit 65 may set the requested drive force for the vehicle 11 along the characteristic line L1 in a case where the accelerator position Acp is 0%, and may set the requested drive force for the vehicle 11 along the characteristic line L2 in a case where the accelerator position Acp is 25%. Similarly, the vehicle control unit 65 may set the requested drive force for the vehicle 11 along the characteristic line L3 in a case where the accelerator position Acp is 50% and may set the requested drive force for the vehicle 11 along the characteristic line L4 in a case where the accelerator position Acp is 100%.

In an example case where the accelerator pedal is so pressed that the accelerator position Acp becomes "50%" in a state in which the vehicle speed is "V1", the vehicle control unit 65 may set "Fa" as the requested drive force. In an example case where the pressing of the accelerator pedal is so released that the accelerator position Acp becomes "0%" in the state in which the vehicle speed is "V1", the vehicle control unit 65 may set "Fb" as the requested drive force. Further, the vehicle control unit 65 may so set a target motor torque of each of the front motor 16 and the rear motor 18 that "Fa" or "Fb" is obtained as the requested drive force, i.e., as a total drive force of the front wheels 12 and the rear wheels 14.

Accordingly, the target motor torque of each of the front motor 16 and the rear motor 18 may be so set as to be on a power running side in a case where the accelerator pedal is pressed and the requested drive force is thus set on an acceleration side. The target motor torque of each of the front motor 16 and the rear motor 18 may be so set as to be on a regeneration side in a case where the pressing of the accelerator pedal is released and the requested drive force is thus set on a deceleration side, i.e., on a braking side. It should be noted that four characteristic lines L1 to L4 are set for the drive force map illustrated in an example of FIG. 4 for easier description, although the number of characteristic lines is not limited thereto. In some embodiments, five or more characteristic lines may be set for the drive force map.

Zero-Cross Control

Figure 5:
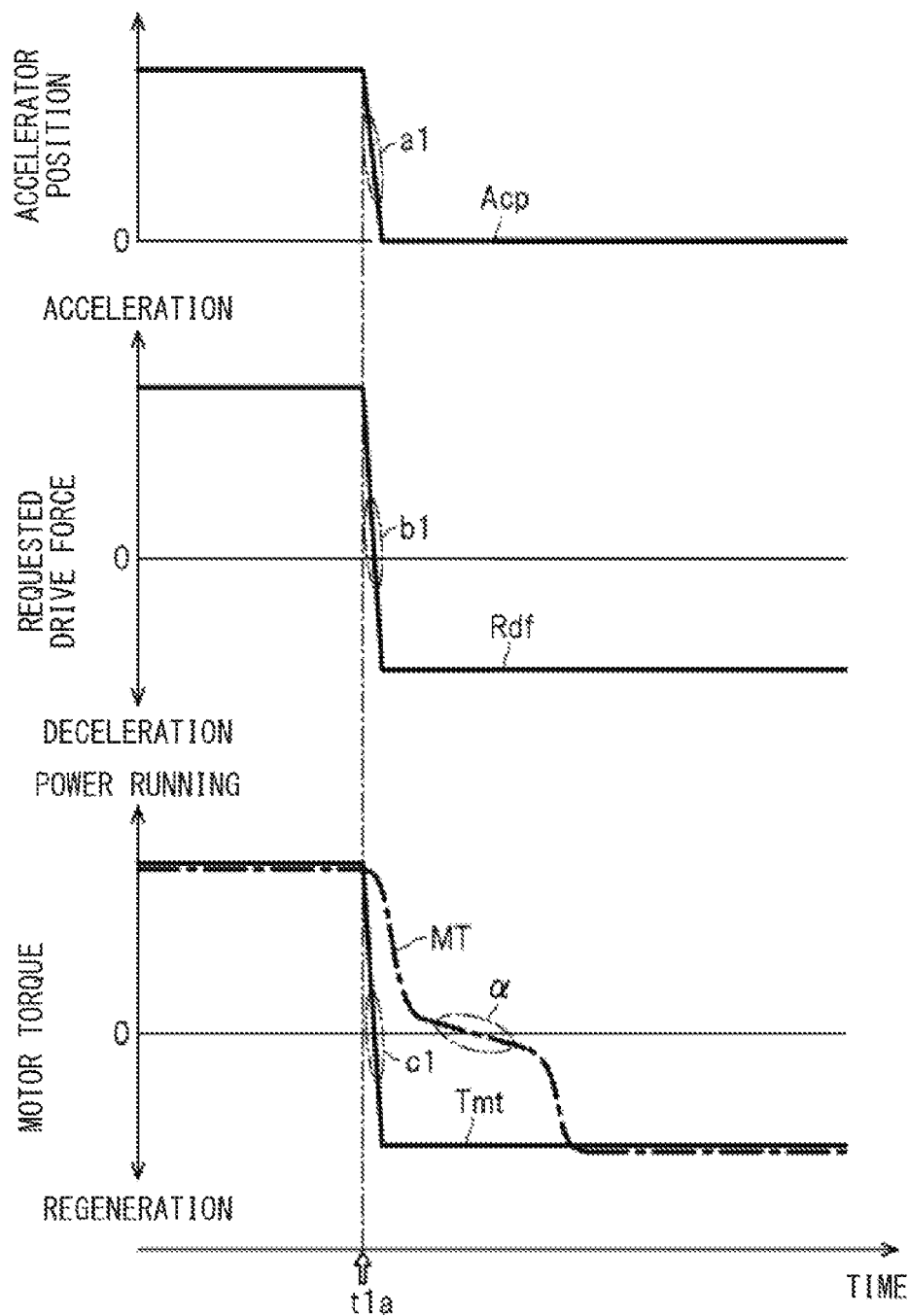
FIG. 5 is a diagram illustrating transitions of the requested drive force and a motor torque upon a release of an accelerator operation.

FIG. 5 is a diagram illustrating transitions of the requested drive force and the motor torque upon a release of an accelerator operation. It should be noted that FIG. 5 illustrates an example in which both the front motor 16 and the rear motor 18 are controlled on the basis of a common target motor torque Tmt. It should also be noted that a motor torque to be actually outputted from the front motor 16 and a motor torque to be actually outputted from the rear motor 18 are denoted by a common reference sign "MT" in the example illustrated in FIG. 5.

As illustrated in FIG. 4, the requested drive force for the vehicle 11 may be set on the acceleration side, in a case where the accelerator pedal is pressed by the driver. In a case where the pressing of the accelerator pedal by the driver is released, the requested drive force for the vehicle 11 may be set on the deceleration side. Accordingly, as denoted by a timing t1a in FIG. 5, in a case where the pressing of the accelerator pedal is released during the traveling of the vehicle 11 and the accelerator position Acp is decreased toward "0%" (denoted by a reference sign a1), a requested drive force Rdf for the vehicle 11 may be switched from the acceleration side to the deceleration side (denoted by a reference sign b1), and the target motor torque Tmt of the front motor 16 and the rear motor 18 may be switched from the power running side to the regeneration side (denoted by a reference sign c1).

It should be appreciated that tooth faces in mesh with each other of various gear trains coupled to the front motor 16 and the rear motor 18 are switched upon the switching of the motor torque MT of the front motor 16 and the rear motor 18 from the power running side to the regeneration side, which can lead to an occurrence of a shock at a timing at which the motor torque MT passes zero. Accordingly, in order to reduce a shock that can occur when the motor torque MT passes zero, the front motor control unit 40 and the rear motor control unit 41 may execute a zero-cross control that decreases a speed of change of the motor torque MT when the motor torque MT passes a predetermined deceleration range that includes zero. This configuration helps to change the motor torque MT moderately as denoted by a reference sign α in FIG. 5 and thereby to reduce the shock that can occur when the motor torque MT passes zero.

Figure 6:
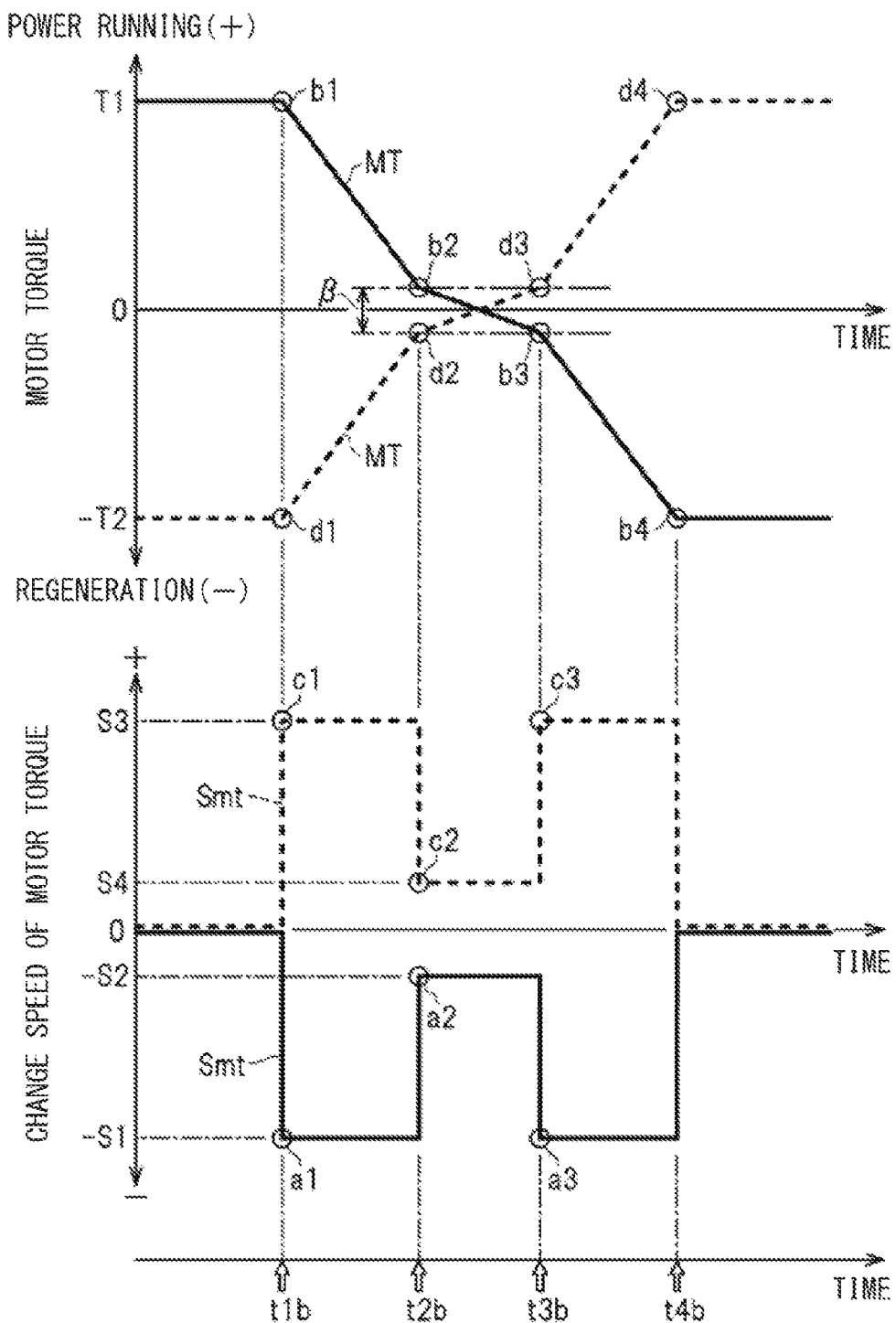
FIG. 6 is a diagram illustrating an example of a situation in which a zero-cross control is in execution.

FIG. 6 is a diagram illustrating an example of a situation in which the zero-cross control is in execution. Described here is an example case in which the pressing of the accelerator pedal is released during the traveling of the vehicle 11 and the motor torque MT is changed from "T1" to "−T2" as denoted by a solid line in FIG. 6. As denoted by a timing t1b, in a case where the pressing of the accelerator pedal is released, a change speed Smt of the motor torque MT may be set to "−S1" (denoted by a reference sign a1) and the motor torque MT on the power running side may be started to be controlled toward zero (denoted by a reference sign b1). Thereafter, as denoted by a timing t2b, in a case where the motor torque MT reaches a deceleration range β that includes zero (denoted by a reference sign b2), the change speed Smt of the motor torque MT may be decreased to a predetermined level of "−S2" (denoted by a reference sign a2). Thereafter, as denoted by a timing t3b, in a case where the motor torque MT has passed zero and fallen out of the deceleration range β (denoted by a reference sign b3), the change speed Smt of the motor torque MT may be increased again to "−S1" (denoted by a reference sign a3), and the motor torque MT may be controlled to "−T2" on the regeneration side (denoted by a reference sign b4) as denoted by a timing t4b.

The zero-cross control that decreases the change speed Smt of the motor torque MT may be executed similarly in a case where the accelerator pedal is pressed during the traveling of the vehicle 11, as denoted by broken lines in FIG. 6. As denoted by the timing t1b, in a case where the accelerator pedal is pressed during deceleration traveling, the change speed Smt of the motor torque MT may be set to "S3" (denoted by a reference sign c1) and the motor torque MT on the regeneration side may be started to be controlled toward zero (denoted by a reference sign d1). Thereafter, as denoted by the timing t2b, in a case where the motor torque MT reaches the deceleration range β that includes zero (denoted by a reference sign d2), the change speed Smt of the motor torque MT may be decreased to a predetermined level of "S4" (denoted by a reference sign c2). Thereafter, as denoted by the timing t3b, in a case where the motor torque MT has passed zero and fallen out of the deceleration range β (denoted by a reference sign d3), the change speed Smt of the motor torque MT may be increased again to "S1" (denoted by a reference sign c3), and the motor torque MT may be controlled to "T1" on the power running side (denoted by a reference sign d4) as denoted by the timing t4b.

Accordingly, the control system 20 may cause the change speed Smt of the motor torque MT which is within the deceleration range β to be decreased as compared with the change speed Smt of the motor torque MT which is outside the deceleration range β, in a case where the motor torque MT is to be changed from the power running side to the regeneration side via the deceleration range β. In one embodiment, the motor torque MT may serve as a "torque". In one embodiment, the change speed Smt of the motor torque MT may serve as a "torque change speed". The control system 20 may also cause the change speed Smt of the motor torque MT which is within the deceleration range β to be decreased as compared with the change speed Smt of the motor torque MT which is outside the deceleration range β, in a case where the motor torque MT is to be changed from the regeneration side to the power running side via the deceleration range β. This configuration helps to reduce a shock that can occur when the motor torque MT so changes as to exceed zero. It should be noted that each of "−S1", "−S2", "S3", and "S4" each indicating the change speed Smt of the motor torque MT may be a preset target speed, or may be a target speed set on the basis of, for example, a difference in torque between the target motor torque Tmt and the motor torque MT.

Pre-Torque-Increasing-Decreasing Control

As described previously, the zero-cross control may be executed that causes the change speed Smt of the motor torque MT to be decreased as compared with the most recent change speed Smt of the motor torque MT when the motor torque MT passes zero. Further, as described previously, the automatic brake control may be executed that brakes the front wheels 12 and the rear wheels 14 by activating the brake device 42, the front motor 16, and the rear motor 18, in a case where the determination is made that there is the possibility of the collision of the vehicle 11. However, executing the zero-cross control upon the automatic brake control can constitute a factor of delaying a rise of the motor torque MT, i.e., the regenerative torque, and can in turn constitute a factor of decreasing a braking performance of the automatic brake control. Accordingly, an example embodiment, the control system 20 may execute a pre-torque-increasing-decreasing control that increases or decreases the motor torque of the front motor 16 and the rear motor 18 in advance in preparation for the automatic brake control, in order to quickly raise the regenerative torque upon the automatic brake control.

Braking Prediction Flag FLa and Braking Fixing Flag FLb

In the following, described is settings of a braking prediction flag FLa and a braking fixing flag FLb to be used for the pre-torque-increasing-decreasing control. The braking prediction flag FLa may be a control flag that is set in a case where the execution of the automatic brake control is predicted. The braking fixing flag FLb may be a control flag that is set in a case where the execution of the automatic brake control is to be started.

Figure 7:
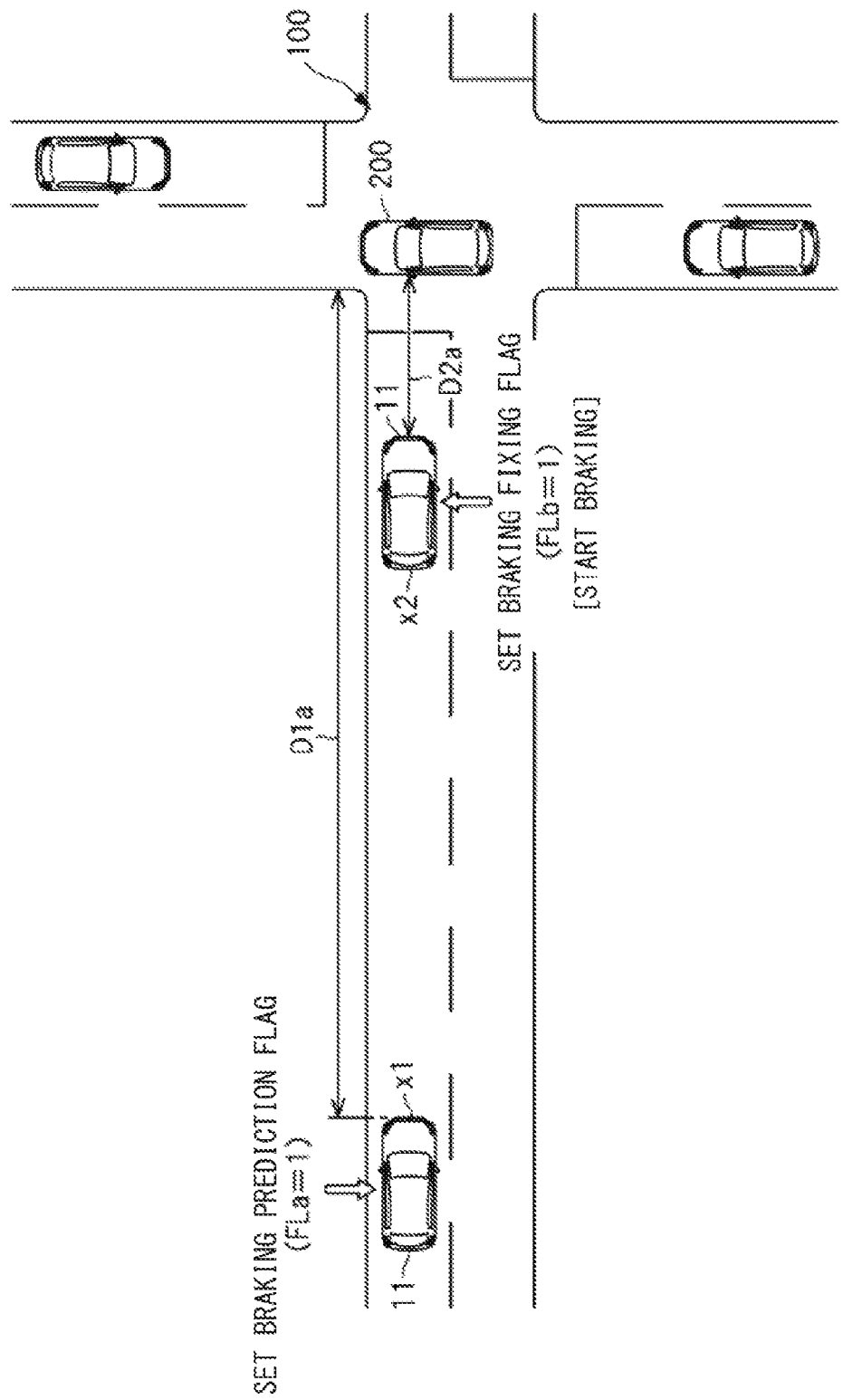
FIG. 7 is a diagram illustrating an example of a traveling situation in which a braking prediction flag and a braking fixing flag are to be set.
Figure 8:
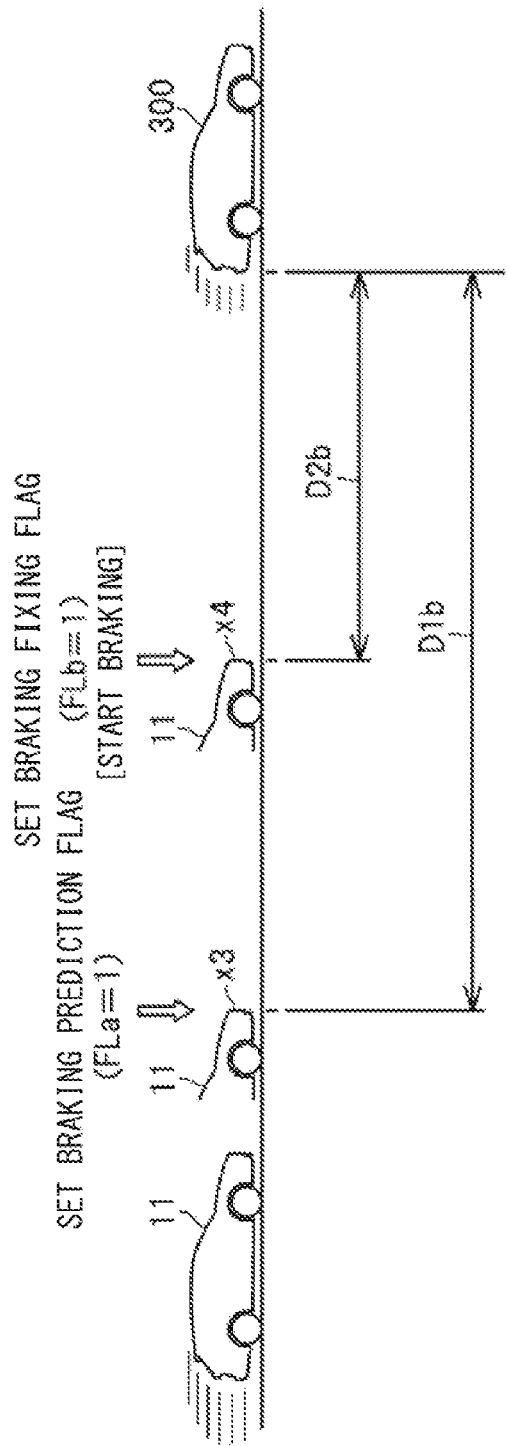
FIG. 8 is a diagram illustrating an example of a traveling situation in which the braking prediction flag and the braking fixing flag are to be set.

FIG. 7 and FIG. 8 are each a diagram illustrating an example of a traveling situation in which the braking prediction flag F1a and the braking fixing flag FLb are to be set. As denoted by a reference sign x1 in FIG. 7, the braking prediction flag FLa that predicts the execution of the automatic brake control may be set (FLa=1), in a case where the vehicle 11 has approached a blind intersection 100 that is registered in advance and a distance from the vehicle 11 to the intersection 100 is less than a braking prediction threshold D1a. In one embodiment, the intersection 100 may serve as a "collision predicted spot" or a "contact predicted spot". In one embodiment, the braking prediction threshold D1a may serve as a "first threshold". Thereafter, as denoted by a reference sign x2, the braking fixing flag FLb may be set that is indicative of a start of the execution of the automatic brake control (FLb=1), in a case where the vehicle 11 has further approached the intersection 100 and a distance from the vehicle 11 to another vehicle 200 traveling through the intersection 100 is less than a braking fixing threshold D2a that is less than the braking prediction threshold D1a. In one embodiment, another vehicle 200 may serve as a "collision object" or a "contact object". In one embodiment, the braking fixing threshold D2a may serve as a "second threshold".

In the foregoing description, the braking fixing flag FLb may be set after the braking prediction flag FLa is set. It should be noted, however, that there is no possibility of the collision of the vehicle 11 and the braking fixing flag FLb may not be set accordingly, in a case where another vehicle 200 or any other obstacle is not present at the intersection 100. The setting of the braking prediction flag FLa may be cancelled (FLa=0), in a case where the vehicle 11 has passed through the intersection 100 after the vehicle 11 has approached the intersection 100 and the braking prediction flag FLa is set accordingly.

The braking prediction threshold D1a used for the setting of the braking prediction flag FLa may be a threshold that increases or decreases on the basis of the vehicle speed of the vehicle 11. For example, the braking prediction threshold D1a may be set to a smaller value as the vehicle speed of the vehicle 11 becomes lower, and may be set to a larger value as the vehicle speed of the vehicle 11 becomes higher. Similarly, the braking fixing threshold D2a used for the setting of the braking fixing flag FLb may be a threshold that increases or decreases on the basis of the vehicle speed of the vehicle 11. For example, the braking fixing threshold D2a may be set to a smaller value as the vehicle speed of the vehicle 11 becomes lower, and may be set to a larger value as the vehicle speed of the vehicle 11 becomes higher. In some embodiments, the braking fixing threshold D2a may be increased or decreased on the basis of a relative speed between the vehicle 11 and another vehicle 200. In this case, the braking fixing threshold D2a may be set to a smaller value as the relative speed between the vehicle 11 and another vehicle 200 becomes lower, and may be set to a larger value as the relative speed between the vehicle 11 and another vehicle 200 becomes higher.

As denoted by a reference sign x3 in FIG. 8, the braking prediction flag FLa that predicts the execution of the automatic brake control may be set (FLa=1), in a case where the vehicle 11 has approached a preceding vehicle 300 and a distance from the vehicle 11 to the preceding vehicle 300 is less than a braking prediction threshold D1b. In one embodiment, the preceding vehicle 300 may serve as the "collision object" or the "contact object". In one embodiment, the braking prediction threshold D1b may serve as the "first threshold". Thereafter, as denoted by a reference sign x4, the braking fixing flag FLb may be set that is indicative of the start of the execution of the automatic brake control (FLb=1), in a case where the vehicle 11 has further approached the preceding vehicle 300 and the distance from the vehicle 11 to the preceding vehicle 300 is less than a braking fixing threshold D2b that is less than the braking prediction threshold D1b. In one embodiment, the braking fixing threshold D2b may serve as the "second threshold". The setting of the braking prediction flag FLa may be cancelled (FLa=0), in a case where the vehicle 11 has so traveled away from the preceding vehicle 300 as to exceed the braking prediction threshold D1b as a result of the deceleration of the vehicle 11 or as a result of the acceleration of the preceding vehicle 300.

The braking prediction threshold D1b used for the setting of the braking prediction flag FLa may be a threshold that increases or decreases on the basis of the vehicle speed of the vehicle 11. For example, the braking prediction threshold D1b may be set to a smaller value as the vehicle speed of the vehicle 11 becomes lower, and may be set to a larger value as the vehicle speed of the vehicle 11 becomes higher. In some embodiments, the braking prediction threshold D1b may be increased or decreased on the basis of a relative speed between the vehicle 11 and the preceding vehicle 300.

In this case, the braking prediction threshold D1b may be set to a smaller value as the relative speed between the vehicle 11 and the preceding vehicle 300 becomes lower, and may be set to a larger value as the relative speed between the vehicle 11 and the preceding vehicle 300 becomes higher. Similarly, the braking fixing threshold D2b used for the setting of the braking fixing flag FLb may be a threshold that increases or decreases on the basis of the vehicle speed of the vehicle 11. For example, the braking fixing threshold D2b may be set to a smaller value as the vehicle speed of the vehicle 11 becomes lower, and may be set to a larger value as the vehicle speed of the vehicle 11 becomes higher. In some embodiments, the braking fixing threshold D2b may be increased or decreased on the basis of the relative speed between the vehicle 11 and the preceding vehicle 300. In this case, the braking fixing threshold D2b may be set to a smaller value as the relative speed between the vehicle 11 and the preceding vehicle 300 becomes lower, and may be set to a larger value as the relative speed between the vehicle 11 and the preceding vehicle 300 becomes higher.

Flowchart

Figure 9:
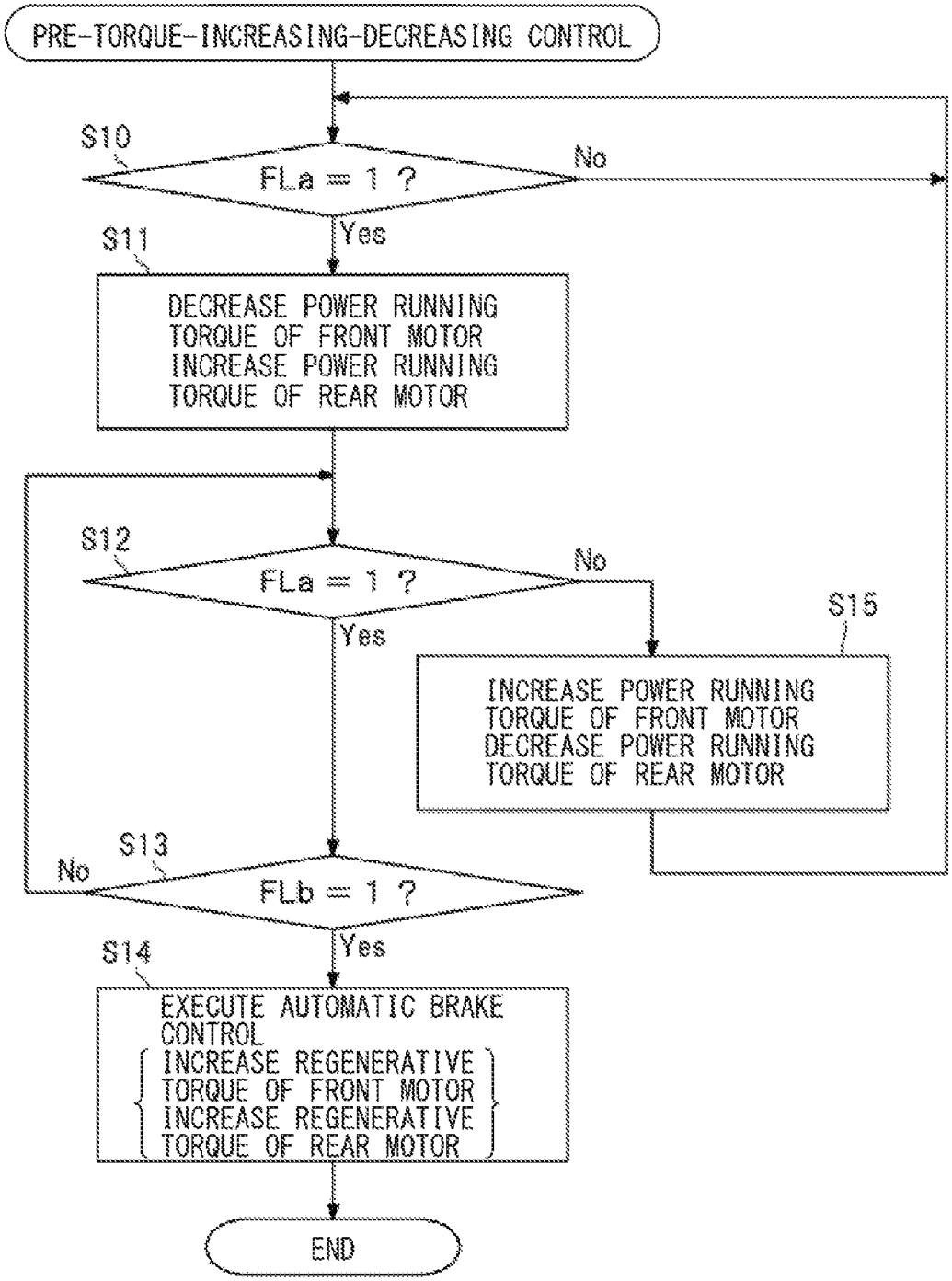
FIG. 9 is a flowchart illustrating an example of a procedure of executing a pre-torque-increasing-decreasing control to be executed during forward traveling.

FIG. 9 is a flowchart illustrating an example of a procedure of executing the pre-torque-increasing-decreasing control to be executed during forward traveling. Each step of the flowchart of FIG. 9 illustrates a process to be executed by one or the plurality of processors 80 configuring the control system 20. The pre-torque-increasing-decreasing control illustrated in FIG. 9 may be executed by the control system 20 for each predetermined cycle, after the start switch 76 is operated by the driver and the control system 20 configured by a device such as the vehicle control unit 65 is started up.

Referring to FIG. 9, in step S10, the control system 20 may determine whether the braking prediction flag FLa is set, i.e., whether "FLa=1" is satisfied. If the control system 20 determines in step S10 that the braking prediction flag FLa is set (step S10: Yes), the procedure may proceed to step S11 on the premise that the execution of the automatic brake control is predicted. In step S11, the control system 20 may cause the power running torque of the front motor 16 to be decreased as compared with a most recent value of the power running torque thereof, and cause the power running torque of the rear motor 18 to be increased as compared with a most recent value of the power running torque thereof. In step S11, the front motor 16 may be so controlled that a predetermined target motor torque (e.g., 0 [Nm] or −1 [Nm]) is achieved, in order to decrease the power running torque of the front motor 16. Further, the control system 20 may so set an amount of increase in the power running torque of the rear motor 18 as to compensate for an amount of decrease in the power running torque of the front motor 16, and so increase the power running torque of the rear motor 18 as to satisfy the set amount of increase in the power running torque of the rear motor 18.

Thereafter, in step S12, the control system 20 may determine whether the setting of the braking prediction flag FLa is continued, i.e., whether "FLa=1" is satisfied. If the control system 20 determines in step S12 that the setting of the braking prediction flag FLa is continued (step S12: Yes), the procedure may proceed to step S13. In step S13, the control system 20 may determine whether the braking fixing flag FLb is set, i.e., whether "FLb=1" is satisfied. If the control system 20 determines in step S13 that the braking fixing flag FLb is set (step S13: Yes), the procedure may proceed to step S14. In step S14, the control system 20 may execute the automatic brake control that raises the regenerative torque of each of the front motor 16 and the rear motor 18. In step S14, the control system 20 may cause the regenerative torque of the front motor 16 to be increased as compared with a most recent value of the regenerative torque thereof, and cause the regenerative torque of the rear motor 18 to be increased as compared with a most recent value of the regenerative torque thereof. This configuration helps to brake the front wheels 12 and the rear wheels 14 by the regenerative torque of the front motor 16 and the regenerative torque of the rear motor 18.

As described previously, the procedure may proceed to step S11 in a case where the control system 20 determines that the braking prediction flag FLa is set, i.e., that the execution of the automatic brake control is predicted, and the control system 20 may decrease the power running torque of the front motor 16 in step S11. This configuration helps to decrease the power running torque of the front motor 16 at a timing that is before the execution of the automatic brake control, which helps to eliminate the necessity of decreasing the power running torque of the front motor 16 after the start of the automatic brake control and quickly raise the regenerative torque of the front motor 16 accordingly. The configuration according to an example embodiment thus helps to quickly raise the regenerative torque of the front motor 16 upon the execution of the automatic brake control and stop the vehicle 11 within a short braking distance.

If the control system 20 determines in step S12 that the setting of the braking prediction flag FLa is cancelled (step S12: No), the procedure may proceed to step S15 on the premise that the vehicle 11 is not under a situation in which the automatic brake control is to be executed. In step S15, the control system 20 may cause the power running torque of the front motor 16 to be increased as compared with a most recent value of the power running torque thereof, and cause the power running torque of the rear motor 18 to be decreased as compared with a most recent value of the power running torque thereof. For example, in step S15, the control system 20 may so increase the power running torque of the front motor 16 and decrease the power running torque of the rear motor 18 as to bring a drive force of the front wheels 12 and a drive force of the rear wheels 14 into coincidence with each other. Thereafter, the procedure may return to step S10 in which the control system 20 may determine again whether the braking prediction flag FLa is set. In some embodiments, in step S15, the control system 20 may so control the power running torque of the front motor 16 and the power running torque of the rear motor 18 as to cause the drive force of the front wheels 12 and the drive force of the rear wheels 14 to be different from each other.

Timing Chart

Figure 10:
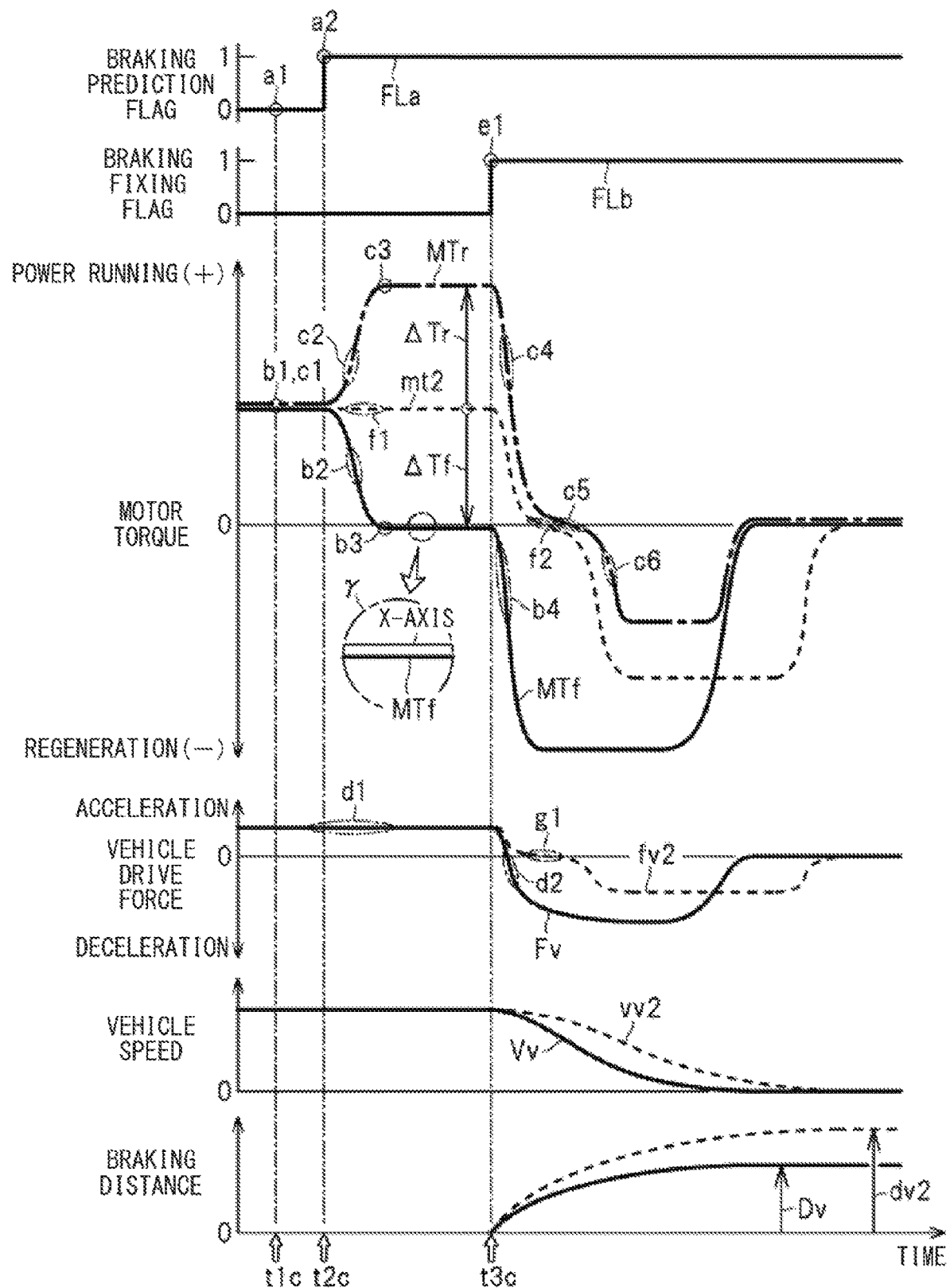
FIG. 10 is a timing chart illustrating an example of a situation in which the pre-torque-increasing-decreasing control is in execution.

FIG. 10 is a timing chart illustrating an example of a situation in which the pre-torque-increasing-decreasing control is in execution. As denoted by solid lines and dashed-dotted lines in FIG. 10. "MTf" refers to a motor torque to be outputted from the front motor 16, "MTr" refers to a motor torque to be outputted from the rear motor 18, "Fv" refers to a vehicle drive force as a sum of the drive force of the front wheels 12 based on the motor torque and the drive force of the rear wheels 14 based on the motor torque, and "Vv" refers to a vehicle speed. As denoted by broken lines, FIG. 10 also illustrates a situation according to a comparative example in which the motor torques are maintained after the setting of the braking prediction flag FLa. "mt2" refers to the motor torques according to the comparative example to be outputted from the front motor 16 and the rear motor 18, "fv2" refers to the vehicle drive force according to the comparative example, and "vv2" refers to the vehicle speed according to the comparative example. In the following description, the motor torques MTf, MTr, and mt2 that increase or decrease on the power running side are respectively referred to as power running torques MTf, MTr, and mt2. The motor torques MTf, MTr, and mt2 that increase or decrease on the regeneration side are respectively referred to as regenerative torques MTf, MTr, and mt2.

As denoted by a timing t1c in FIG. 10, in a situation in which the braking prediction flag FLa is not set (denoted by a reference sign a1), the power running torque MTf and the power running torque MTr may be controlled toward respective predetermined target motor torques set on the basis of the requested drive force (denoted by reference signs b1 and c1). In an example illustrated in FIG. 10, the power running torque MTf and the power running torque MTr may be brought into coincidence with each other, although they are not limited thereto. In some embodiments, the power running torque MTf and the power running torque MTr may be made different from each other to cause the drive force of the front wheels 12 and the drive force of the rear wheels 14 to be different from each other.

Thereafter, as denoted by a timing t2c, in a case where the vehicle 11 has approached an intersection or an obstacle such as a preceding vehicle and the braking prediction flag FLa is set accordingly (denoted by a reference sign a2), the control system 20 may decrease the power running torque MTf of the front motor 16 (denoted by a reference sign b2), and increase the power running torque MTr of the rear motor 18 (denoted by a reference sign c2). Here, as denoted by an enlarged part γ in FIG. 10, the motor torque MTf of the front motor 16 may be controlled toward the target motor torque (e.g., −1 [Nm]) set on the regeneration side, i.e., on a minus (−) side (denoted by a reference sign b3). Accordingly, in a case where the braking prediction flag FLa is set (denoted by the reference sign a2), the control system 20 may decrease the power running torque MTf of the front motor 16 (denoted by the reference sign b2), and control the motor torque MTf of the front motor 16 to be on the regeneration side (denoted by the reference sign b3).

Further, the control system 20 may so set an increase amount ΔTr of the power running torque MTr of the rear motor 18 as to compensate for a decrease amount ΔTf of the power running torque MTf of the front motor 16, and so increase the power running torque MTr of the rear motor 18 as to satisfy the set increase amount ΔTr of the power running torque MTr of the rear motor 18 (denoted by a reference sign c3). This configuration helps, even in a case where the power running torques MTf and MTr are to be increased and decreased (denoted by the reference signs b3 and c3), to compensate for the decrease in the power running torque MTf with the increase in the power running torque MTr, and to so keep the vehicle drive force Fv to a substantially constant level as not to give the driver a sense of discomfort (denoted by a reference sign d1). It should be noted that, in an example embodiment, the decrease amount ΔTf and the increase amount ΔTr of the power running torques MTf and MTr may be coincident with each other due to, for example, a mutual coincidence of gear ratios of the front drive unit 13 and the rear drive unit 15 and a mutual coincidence of wheel diameters of the front wheels 12 and the rear wheels 14.

Thereafter, as denoted by a timing t3c, in a case where the vehicle 11 has further approached, for example, the preceding vehicle and the braking fixing flag FLb is set accordingly (denoted by a reference sign e1), the control system 20 may execute the automatic brake control that increases the regenerative torque MTf and MTr of the respective front motor 16 and rear motor 18. At this time, the power running torque MTf of the front motor 16 is already decreased, which eliminates a necessity of decreasing the power running torque MTf after the start of the automatic brake control and helps to quickly raise the regenerative torque MTf of the front motor 16 accordingly (denoted by a reference sign b4). Further, the front motor 16 is already in the regeneration state, which eliminates a necessity of performing the zero-cross control on the front motor 16 and helps to quickly raise the regenerative torque MTf from this perspective as well (denoted by a reference sign b4). Because the rear motor 18 is in the power running state, the control system 20 may decrease the power running torque MTr (denoted by a reference sign c4), following which the control system 20 may increase the regenerative torque MTr via the zero-cross control (denoted by reference signs c5 and c6).

Accordingly, the control system 20 may decrease the power running torque MTf of the front motor 16 (denoted by the reference sign b3), in a case where the braking prediction flag FLa is set, i.e., where the execution of the automatic brake control is predicted. In other words, the power running torque MTf of the front motor 16 is decreased at the timing before the execution of the automatic brake control, which helps to quickly raise the regenerative torque MTf of the front motor 16 (denoted by the reference sign b4) in a case where the automatic brake control is to be executed thereafter. This configuration helps to quickly change the vehicle drive force Fv on the deceleration side (denoted by a reference sign d2). This in turn helps to quickly decrease the vehicle speed Vv and stop the vehicle 11 within the short breaking distance Dv.

In addition, quickly raising the regenerative torque MTf of the front motor 16 helps to quickly raise the braking force of the front wheels 12 positioned at a front part of the vehicle 11 in a traveling direction of the vehicle. Thus, it helps to increase the braking force of the vehicle 11 and increase the braking performance of the automatic brake control. The front wheels 12 positioned at the front part of the vehicle 11 in the traveling direction upon the forward traveling receive a larger load upon braking of the vehicle 11 than the rear wheels 14 positioned at a rear part of the vehicle 11 in the traveling direction. Accordingly, quickly raising the regenerative torque MTf to be transmitted to the front wheels 12 helps to quickly generate the large braking force at the front wheels 12. This in turn helps to increase the braking force of the vehicle 11 and increase the braking performance of the automatic brake control. It should be noted that not only the front wheels 12 and the rear wheels 14 are braked by the front motor 16 and the rear motor 18 but they are also braked by the brake device 42 upon the automatic brake control.

A reference is now made to the comparative example in which, in a case where the braking prediction flag FLa is set (denoted by the reference numeral a2), the power running torque mt2 of the front motor 16 and the rear motor 18 is maintained (denoted by a reference numeral f1). In the comparative example, it is necessary to change the motor torque mt2 of the front motor 16 and the rear motor 18 from the power running side to the regeneration side, and to perform the zero-cross control on both of the front motor 16 and the rear motor 18 accordingly (denoted by a reference numeral f2). Hence, it is difficult to quickly raise the regenerative torque mt2 of the front motor 16 and the rear motor 18 in response to the execution of the automatic brake control. In other words, it is difficult to quickly change the vehicle drive force fv2 on the deceleration side (denoted by a reference numeral g1), causing the vehicle speed vv2 to decrease moderately as compared with the vehicle speed Vv according to an example embodiment and consequently leading to an extension of the braking distance dv2 as compared with the braking distance Dv according to an example embodiment.

Another Example of Target Motor Torque in Pre-Torque-Increasing-Decreasing Control In an example embodiment illustrated in FIG. 10, in a case where the braking prediction flag FLa is set (denoted by the reference sign a2), the control system 20 may decrease the power running torque MTf of the front motor 16 (denoted by the reference sign b2), and control the motor torque MTf of the front motor 16 to be on the regeneration side (denoted by the reference sign b3), although it is not limited thereto. In some embodiments, the targe motor torque of the front motor 16 may be set to "0 [Nm]". Accordingly, in a case where the braking prediction flag FLa is set, the power running torque MTf of the front motor 16 may be decreased to control the motor torque MTf of the front motor 16 to be zero. Controlling the motor torque MTf of the front motor 16 to be zero in this way also helps to quickly raise the regenerative torque MTf of the front motor 16 upon executing the automatic brake control.

In other words, decreasing the power running torque MTf of the front motor 16 in advance in preparation for the execution of the automatic brake control eliminates the necessity of decreasing the power running torque MTf of the front motor 16 after the start of the automatic brake, and helps to quickly raise the regenerative torque MTf of the front motor 16. Further, controlling the motor torque MTf of the front motor 16 to be zero eliminates the necessity of changing the motor torque MTf from the power running side to the regeneration side upon executing the automatic brake control. This eliminates the necessity of performing the zero-cross control on the front motor 16 upon executing the automatic brake control and helps to quickly raise the regenerative torque MTf from this perspective as well.

In some embodiments, the target motor torque of the front motor 16 may be set to "+1 [Nm]" to control the motor torque MTf of the front motor 16 to be on the power running side near zero by decreasing the power running torque MTf of the front motor 16 in a case where the braking prediction flag FLa is set. Controlling the motor torque MTf of the front motor 16 to be near zero in this way also helps to quickly raise the regenerative torque MTf of the front motor 16 upon executing the automatic brake control. In other words, decreasing the power running torque MTf of the front motor 16 in advance in preparation for the execution of the automatic brake control eliminates the necessity of decreasing the power running torque MTf of the front motor 16 after the start of the automatic brake control, and helps to quickly raise the regenerative torque MTf of the front motor 16 accordingly.

It should be noted that the motor torque MTf of the front motor 16 may be controlled from the power running side to the regeneration side by the automatic brake control, in some embodiments where the target motor torque of the front motor 16 is set to "+1 [Nm]". In this case, the zero-cross control can be executed together with the automatic brake control upon the execution of the automatic brake control, depending on the setting of the deceleration range β illustrated in FIG. 6. Accordingly, in such a case, the execution of the zero-cross control to be executed together with the automatic brake control may be prohibited to allow the regenerative torque MTf of the front motor 16 to be raised quickly.

Pre-Torque-Increasing-Decreasing Control During Backward Traveling

The pre-torque-increasing-decreasing control to be executed during the forward traveling is described above with reference to FIGS. 9 and 10, although the pre-torque-increasing-decreasing control according to an example embodiment is not limited thereto. The pre-torque-increasing-decreasing control may be likewise executed during backward traveling. In this case, in one embodiment, the rear wheels 14 positioned at the front part of the vehicle 11 in the traveling direction may serve as the "first wheel", and the front wheels 12 positioned at the rear part of the vehicle 11 in the traveling direction may serve as the "second wheel". Further, the rear motor 18 may serve as the "first traveling motor", and the front motor 16 may serve as the "second traveling motor".

For example, in a case where the braking prediction flag FLa is set during the backward traveling, the power running torque MTr of the rear motor 18 may be decreased and the power running torque MTf of the front motor 16 may be increased. Thereafter, in a case where the braking fixing flag FLb is set, the regenerative torque MTr of the rear motor 18 may be increased and the regenerative torque MTf of the front motor 16 may be increased. This configuration helps to quickly raise the regenerative torque MTr of the rear motor 18. Thus, it helps to increase the braking force of the vehicle 11 and increase the braking performance of the automatic brake control. The rear wheels 14 positioned at the front part of the vehicle 11 in the traveling direction upon the backward traveling receive a larger load upon braking of the vehicle 11 than the front wheels 12 positioned at the rear part of the vehicle 11 in the traveling direction. Accordingly, quickly raising the regenerative torque MTr to be transmitted to the rear wheels 14 helps to quickly generate the large braking force at the rear wheels 14. This in turn helps to increase the braking force of the vehicle 11 and increase the braking performance of the automatic brake control.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the foregoing description, the control system 20 may be configured by the plurality of control units including the battery control unit 34, the front motor control unit 40, the rear motor control unit 41, the brake control unit 48, the driving assist control unit 54, the navigation control unit 61, and the vehicle control unit 65, although it is not limited thereto. In some embodiments, the control system 20 may be configured by the single control unit. In the foregoing description, the single front motor 16 may be coupled to the pair of right and left front wheels 12, and the single rear motor 18 may be coupled to the pair of right and left rear wheels 14, although it is not limited thereto. In some embodiments, the two front motors 16 may be provided for the front wheels 12 to couple the single front motor 16 to the single front wheel 12, and the two rear motors 18 may be provided for the rear wheels 18 to couple the single rear motor 18 to the single rear wheel 14. The vehicle 11 is not limited to an electric vehicle according to an illustrated example embodiment, and may be a fuel cell vehicle or a hybrid vehicle.

In the foregoing description, the collision predicted spot such as the intersection may be registered in the navigation system 60, although it is not limited thereto. In some embodiments, an intersection with no traffic lights, or any other spot at which an accident tends to occur more easily, may be identified on the basis of image data obtained by, for example, the front camera 50, and the-thus identified intersection or the like may be utilized as the collision predicted spot. In an example illustrated in FIG. 10, the zero-cross control of the rear motor 18 may be executed together with the automatic brake control (denoted by the reference sign c5), although it is not limited thereto. In some embodiments, the execution of the zero-cross control may be cancelled or discontinued to further quicken the rise of the regenerative torque MTr.

The braking prediction threshold D1a may be a variable value that increases or decreases on the basis of the vehicle speed as described above, although it is not limited thereto. In some embodiments, the braking prediction threshold D1a may be a fixed value. The braking fixing threshold D2a may be a variable value that increases or decreases on the basis of the vehicle speed or the relative speed, although it is not limited thereto. In some embodiments, the braking fixing threshold D2a may be a fixed value. Similarly, the braking prediction threshold D1b may be a variable value that increases or decreases on the basis of the vehicle speed or the relative speed, although it is not limited thereto. In some embodiments, the braking prediction threshold D1b may be a fixed value. The braking fixing threshold D2b may be a variable value that increases or decreases on the basis of the vehicle speed or the relative speed, although it is not limited thereto. In some embodiments, the braking fixing threshold D2b may be a fixed value.

The vehicle control apparatus according to at least one embodiment of the technology decreases the power running torque of the first traveling motor and increases the power running torque of the second traveling motor, in a case where a distance from the vehicle to the contact predicted spot or the contact object is less than the first threshold during traveling of the vehicle. Accordingly, the vehicle control apparatus helps to quickly raise the regenerative torque of the first traveling motor.

As used herein, the term "collision" may be used interchangeably with the term "contact".

The control system 20 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control system 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control system 20 illustrated in FIG. 2.

The invention claimed is:

1. A vehicle control device to be applied to a vehicle, the vehicle comprising a first wheel, a second wheel, a first traveling motor coupled to the first wheel, and a second traveling motor coupled to the second wheel, the first wheel being disposed at a position in a first direction along a longitudinal axis of the vehicle relative to the second wheel, the vehicle control device comprising a control system (1) including a processor and a memory that are coupled to each other to allow for a communication between the processor and the memory and (2) being configured to:

determine whether a distance from the vehicle to a contact predicted spot or an object is less than a first threshold while the vehicle is traveling toward the first direction;

determine whether the distance is less than a second threshold while the vehicle is traveling toward the first direction, the second threshold being less than the first threshold;

in response to determining that the distance is not less than the first threshold, perform a first control, wherein, in the first control, the control system is configured to cause the vehicle to travel toward the first direction at a target speed by (1) controlling the first traveling motor to generate a first torque greater than zero and (2) controlling the second traveling motor to generate a second torque greater than zero, the first torque generating a first driving force at the first wheel to travel the vehicle toward the first direction, wherein the second torque generates a second driving force at the second wheel to travel the vehicle toward the first direction;

in response to determining that the distance is less than the first threshold and is not less than the second threshold, perform a second control, wherein, in the second control, the control system is configured to cause the vehicle to travel toward the first direction at the target speed by (1) controlling the first traveling motor to generate zero torque or a third torque less than zero and (2) controlling the second traveling motor to generate a fourth torque greater than the second torque, wherein the third torque generates a third driving force at the first wheel in an opposite direction of the first driving force, while the fourth torque generates a fourth driving force at the second wheel, and the fourth driving force includes both the second driving force and a compensating driving force to offset loss of the first driving force; and in response to determining that the distance is less than the second threshold, perform a third control, wherein, in the third control, the control system is configured to cause the vehicle to decelerate by (1) controlling the first traveling motor to generate a fifth torque less than the third torque, and (2) controlling the second traveling motor to generate a sixth torque less than zero, wherein the fifth torque generates a fifth driving force at the first wheel in the opposite direction of the first driving force, while the sixth torque generates a driving force at the second wheel in the opposite direction of the second driving force.

2. The vehicle control device according to claim 1, wherein the control system is further configured to, in a case where a torque of the first traveling motor is changed from a value greater than zero to a value less than zero through a predetermined deceleration range including zero, reduce a rate of change of the torque of the first traveling motor within the predetermined deceleration range compared to a rate of change outside the predetermined deceleration range.

* * * * *